(12) United States Patent
Zantout et al.

(10) Patent No.: US 8,323,048 B2
(45) Date of Patent: Dec. 4, 2012

(54) CONDUIT CONNECTOR WITH TWO HOUSINGS FOR CONNECTION TO FLEXIBLE CONDUIT

(75) Inventors: Alan E. Zantout, Sycamore, IL (US); Dennis M. Breen, IV, West Chicago, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 13/195,937

(22) Filed: Aug. 2, 2011

(65) Prior Publication Data
US 2012/0032436 A1 Feb. 9, 2012

Related U.S. Application Data

(60) Provisional application No. 61/370,133, filed on Aug. 3, 2010.

(51) Int. Cl.
*H01R 11/00* (2006.01)
(52) U.S. Cl. ....................................................... 439/502
(58) Field of Classification Search .................. 439/502, 439/271–275
See application file for complete search history.

(56) References Cited

U.S. PATENT DOCUMENTS

| | | | |
|---|---|---|---|
| 2,479,483 A | 8/1949 | Ekleberry | |
| 4,021,604 A * | 5/1977 | Dola et al. | 174/51 |
| 4,073,559 A | 2/1978 | Lawson, Jr. | |
| 4,272,148 A | 6/1981 | Knack, Jr. | |
| 4,457,576 A | 7/1984 | Cosmos et al. | |
| 5,356,181 A | 10/1994 | Shirogane et al. | |
| 5,647,765 A | 7/1997 | Haas et al. | |
| 5,679,023 A | 10/1997 | Anderson, Jr. et al. | |
| 5,681,180 A | 10/1997 | Rodrigues | |
| 5,819,405 A | 10/1998 | Marder et al. | |
| 5,895,292 A | 4/1999 | Affeltranger | |
| 6,059,607 A | 5/2000 | Wilson | |
| 6,071,145 A | 6/2000 | Toly | |
| 6,126,490 A | 10/2000 | Anderson, Jr. et al. | |
| 6,537,103 B2 | 3/2003 | Jamison | |
| 6,974,911 B2 | 12/2005 | Hyde | |
| 6,988,746 B2 | 1/2006 | Olson | |
| 7,074,087 B2 | 7/2006 | Szczesny et al. | |

* cited by examiner

*Primary Examiner* — Chandrika Prasad
(74) *Attorney, Agent, or Firm* — Cook Alex Ltd.

(57) ABSTRACT

A conduit connector adapted to connect to flexible electrical conduit has a first housing with a front portion adapted to engage a front portion of a second housing. The front portion of the first housing comprises a cavity adapted to contain a first portion of an electrical connector assembly, while the front portion of the second housing comprises a cavity adapted to contain a respective second portion of the electrical connector assembly. The conduit connector further may include one or more sealing elements to prevent the intrusion of dust, debris or containments.

19 Claims, 8 Drawing Sheets

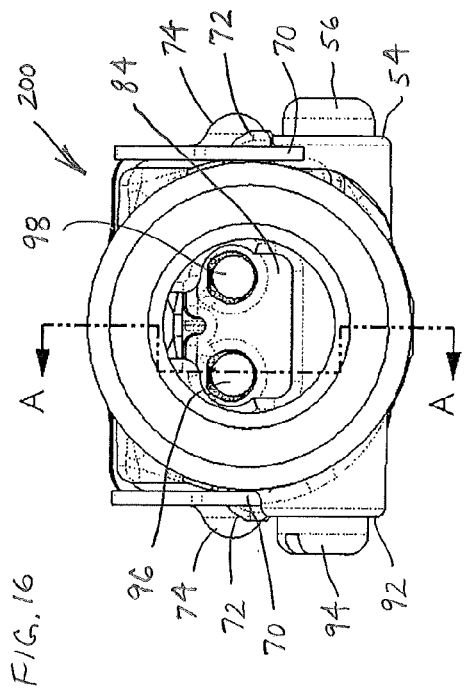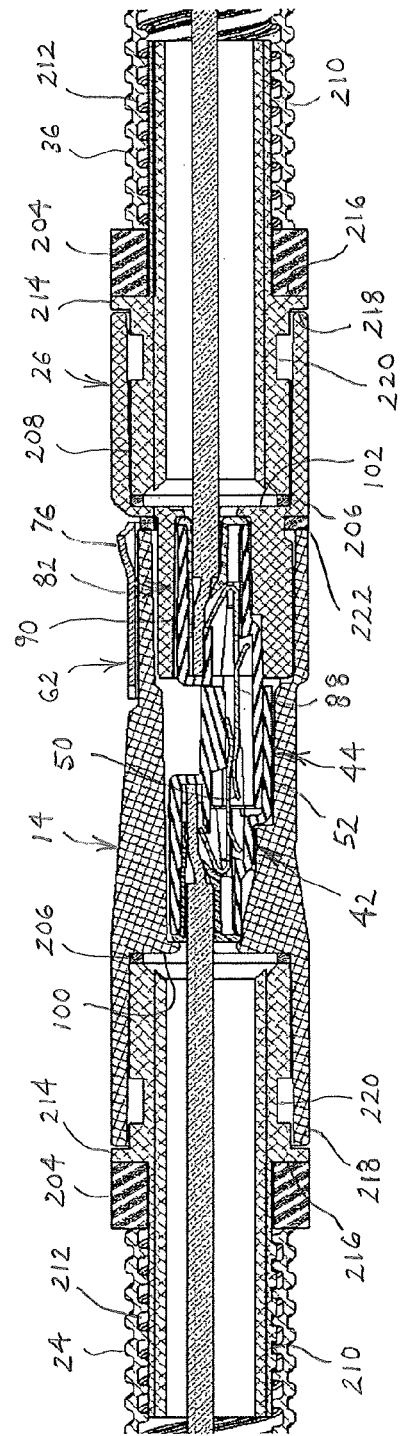

CONDUIT CONNECTOR WITH TWO HOUSINGS FOR CONNECTION TO FLEXIBLE CONDUIT

CROSS-REFERENCE TO RELATED APPLICATION

This application claims the benefit of U.S. Provisional Patent Application Ser. No. 61/370,133, filed Aug. 3, 2010, the disclosure of which is hereby incorporated by reference in its entirety.

BACKGROUND

This disclosure relates to a conduit connector with an electrical connector completely enclosed within the conduit connector for use with flexible conduit.

Various conduit connectors are adapted for attachment only to an electrical panel. Other conduit connectors are configured to couple with an electrical connector, but generally are not configured with an electrical connector enclosed within and to be coupled in-line with a respective mating conduit connector for easy mating and unmating of the wires. While being useful in many electrical wiring environments, this is particularly useful, for example, in applications such as prefabricated wiring systems, luminaires, and industrial equipment, where a quick and simple method of installing or servicing could be utilized.

Flexible electrical conduit typically comprises a flexible metal tube that protects and encloses one or more electrical wires, although it will be appreciated that the flexible conduit could be constructed of other materials, such as plastic. Often the flexible conduit is sold with wires already disposed therein, and may alternatively be referred to as multi-conductor flexible conduit. Generally the connections to the flexible conduit are made at an electrical panel or an electrical device and these connections are for only the conduit not the wires contained within. Wires located within the flexible conduit then are separately terminated (electrically connected) within the panel or within the electrical device. In certain applications it may be preferred to make a connection between two pieces of flexible conduit or between a piece of flexible conduit and a panel, box or other electrical device. In such instances it also is required to terminate or connect the wires from one of the pieces of flexible conduit to the other or to the panel, box or other electrical device. An example of the type of connection between two pieces of flexible conduit is disclosed in U.S. Pat. No. 6,537,103 to Jamison.

It will be appreciated that the disclosed conduit connector with an electrical connector enclosed therein could be incorporated into various electrical wiring systems, apparatus and electrical systems. Accordingly, while the present disclosure shows and demonstrates various example components, the examples are merely illustrative and are not to be considered limiting. It will be apparent to those of ordinary skill in the art that various conduit connectors, electrical connectors, electrical apparatus and systems can be constructed without departing from the scope or spirit of the present disclosure. Thus, although certain examples have been described herein, the scope of coverage of this patent is not limited thereto.

SUMMARY

In accordance with a first example embodiment of the present disclosure, a conduit connector with an enclosed electrical connector is provided for use with flexible conduit. The conduit connector comprises first and second housings that are configured to engage each other, with each housing adapted to contain one of two portions of a mating electrical connector assembly. The first and second housings each include a front portion with a first face. Each respective first face includes a cavity that contains one of the portions of the electrical connector assembly. The first face of the front portion of the first housing of the conduit connector also is adapted to engage the first face of the front portion of the corresponding second housing of the conduit connector, such as in a mating, overlapping configuration. The electrical connector assembly portions each have a first face that is adapted to receive an inserted conductor of a stripped end of a wire, and a second face adapted to engage a second face of the corresponding portion of the electrical connector assembly. At least one of the first and second housings of the conduit connector includes a rear portion with a second face that includes a cavity that is adapted to receive an end of a flexible conduit. The housing that is adapted to receive the flexible conduit is configured to receive a fastener to retain the end of the flexible conduit, such as a screw that compresses the flexible conduit against an inner wall of the respective cavity. In the particular first example illustrated, each of the first and second housings of the conduit connector is adapted to be connected to a flexible conduit.

According to a second embodiment of the present disclosure, a fitting may be disposed between each housing of the conduit connector and a respective flexible conduit, with sealing elements being placed between the engagement surfaces of the fitting and housing and of the fitting and flexible conduit. The additional fittings and sealing elements may be used to create an airtight conduit connector enclosure, thus providing a more robust connection system that prevents debris, dust, or other contaminants from entering the electrical connector assembly that is retained within the conduit connector.

An advantage of the conduit connector of the present disclosure is that it provides a simple and inexpensive method of connecting flexible conduit both externally and via the internal conductive wires.

Another advantage of the conduit connector of the present disclosure is that it provides a method of connecting flexible conduit without the need for special tools.

Another advantage of the conduit connector of the present disclosure is that it provides an enclosure for an electrical connector to be adapted for use with flexible conduit.

Other objects, advantages and salient features of the disclosure will become apparent from the following detailed description, which is accompanied by the annexed drawings.

BRIEF DESCRIPTION OF THE DRAWINGS

FIG. 16 is an end view of the conduit connector of FIG. 12 in an installed position.

FIG. 17 is a section view A-A of the conduit connector shown in FIG. 16.

DETAILED DESCRIPTION

Figure 1:
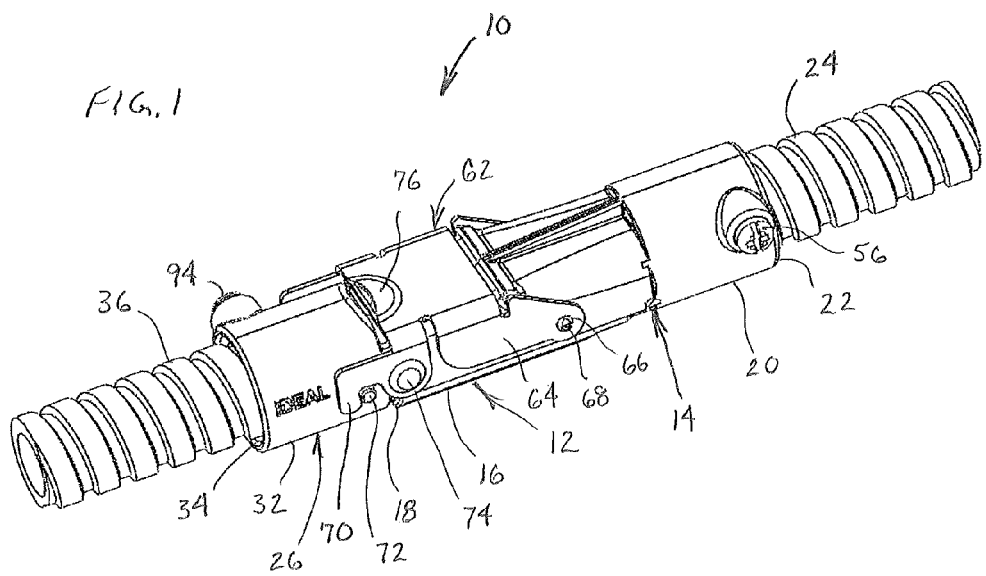
FIG. 1 is a perspective view of a first example conduit connector in an installed position.

A first example conduit connector 10 is illustrated in FIGS. 1-11. The conduit connector 10 includes an enclosure 12 having a first housing 14 with a front portion 16 that has a first face 18. The first housing 14 further includes a rear portion 20 having a second face 22 adapted to receive a first flexible conduit 24, such as at an end thereof. The corresponding second housing 26 of the enclosure 12 includes a front portion 28 having a first face 30. The second housing 26 further includes a rear portion 32 having a second face 34 adapted to receive a second flexible conduit 36, such as at an end thereof. The front portion 16 of the first housing 14 is configured to engage the front portion 28 of the second housing 26, and in this example, such engagement is in a mating, overlapping relationship. The first and second housings 14, 26 of the conduit connector 10 are preferably constructed of metal or other suitable rigid material and can be formed in any suitable manner, such as by casting or molding.

Figure 3:
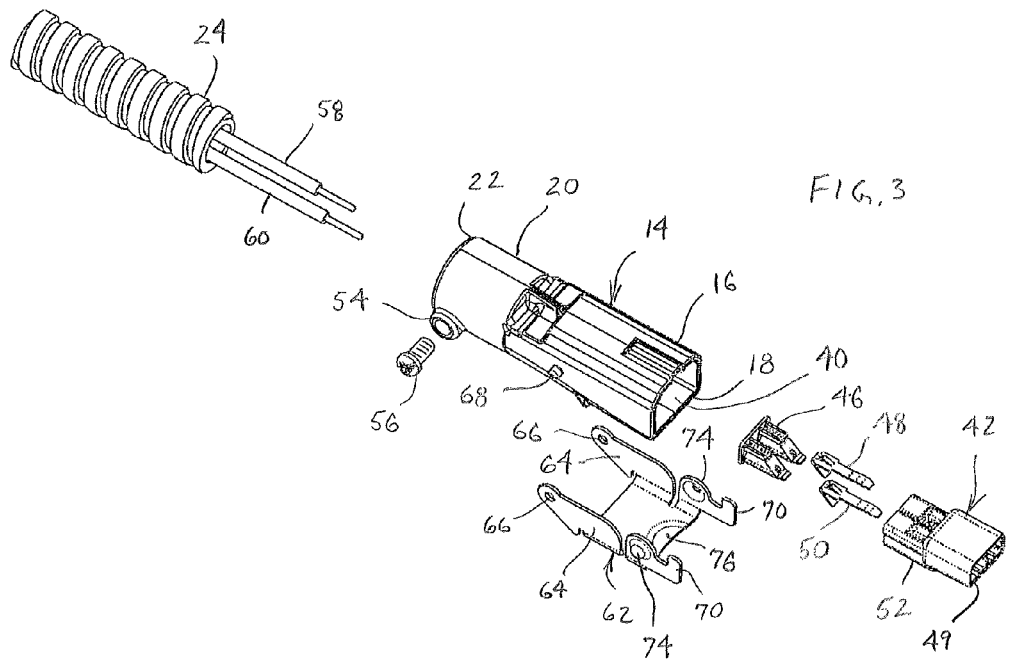
FIG. 3 is a perspective exploded view of a first housing of the conduit connector of FIG. 1, with a first portion of a mating electrical connector assembly.

As can be seen in FIG. 3, the first face 18 of the front portion 16 of the first housing 14 of the conduit connector 10 has a cavity 40 that is adapted to contain a first portion 42 of an electrical connector assembly 44. The example first portion 42 of the electrical connector assembly 44 is comprised of a wire cap 46, terminals 48, 50, and a non-conductive housing 52. The wire cap 46 and non-conductive housing 52 preferably are constructed of plastic, such as by molding, while the terminals 48, 50 are constructed of conductive material to assist in forming electrical connections.

In this example, the rear portion 20 of the first housing 14 of the conduit connector 10 includes a third face 54. The third face 54 is adapted to receive a fastener 56, such as a threaded screw, which can be adjusted to retain the first housing 14 on the first flexible conduit 24. While the illustrated example uses a screw driver driven threaded fastener, it will be appreciated that other connection configurations could be utilized for the connections between the housings of the conduit connector and the flexible conduit or other electrical devices, such as if the fasteners include a winged head for easy gripping, or the housings include internal engagement structures, such as projections that permit threadable engagement with the outside of the flexible conduit. Also, while the current example shows two conductors, wires 58, 60, extending from the first flexible conduit 24, it will be appreciated that as few as one conductor or as many as three or more conductors could be disposed in and extend from the respective flexible conduit, with the conduit connector being adapted to accommodate the chosen number of conductors.

In the first illustrated example, the terminals 48, 50 permit quick, push-in wire termination for the conductive portions of the wires 58, 60 extending from the first flexible conduit 24, with the wire cap 46 allowing for zero insertion force wire termination. The wire cap 46 forms a first face of the first portion 42 of the electrical connector assembly 44 and permits insertion of the wires, while an opposite second face 49 of the first portion 42 is adapted for engagement with a second portion of the electrical connector assembly 44.

Figure 2:
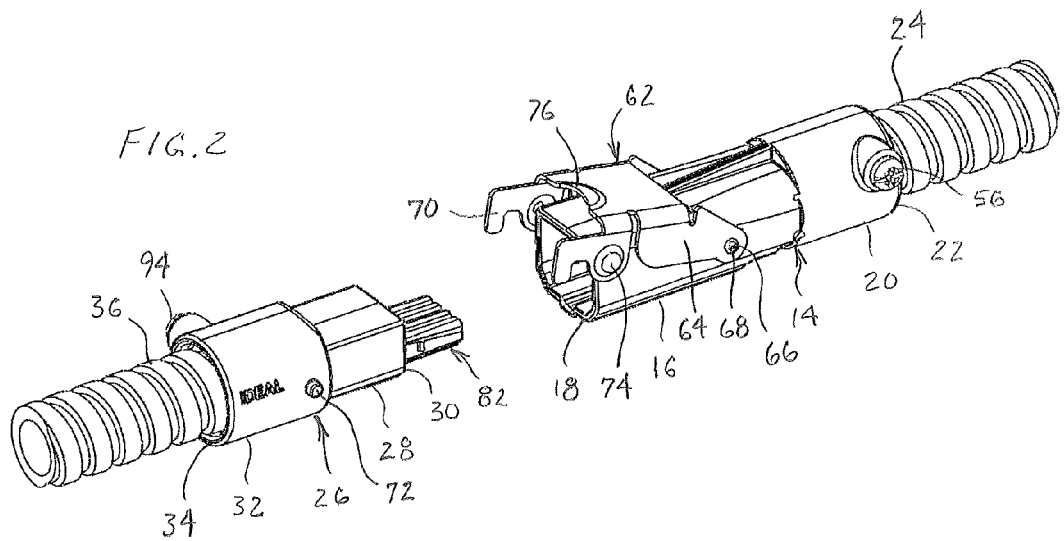
FIG. 2 is a perspective view of the conduit connector of FIG. 1 in a disconnected position.

The conduit connector 10 also includes a retention clip 62 that is configured to be moved between latching and unlatching positions, which may be otherwise considered locked and unlocked positions, such as are illustrated in FIGS. 1 and 2, respectively. The retention clip 62 permits secure connection of the first housing 14 to the second housing 26 of the conduit connector 10. The retention clip 62 has sides 64 that extend rearward and include an aperture 66 for pivotal engagement over posts 68 that extend from sides of the first housing 14. The retention clip 62 further includes hooks 70 that extend forward for releasable engagement with posts 72 that extend from sides of the second housing 26. For ease of moving the retention clip 62 between latching and unlatching positions, the retention clip 62 has projections 74 that extend laterally from the hooks 70 and allow for ease of gripping and movement, and a raised lip 76 that permits manipulation by use of a finger tip or insertion of a common prying object, such as a screwdriver. The retention clip 62 preferably is constructed of a material that has some resiliency, such as steel, and is adapted to retain the first and second housings 14, 26 of the conduit connector 10 in overlapping fashion to form the enclosure 12.

Figure 4:
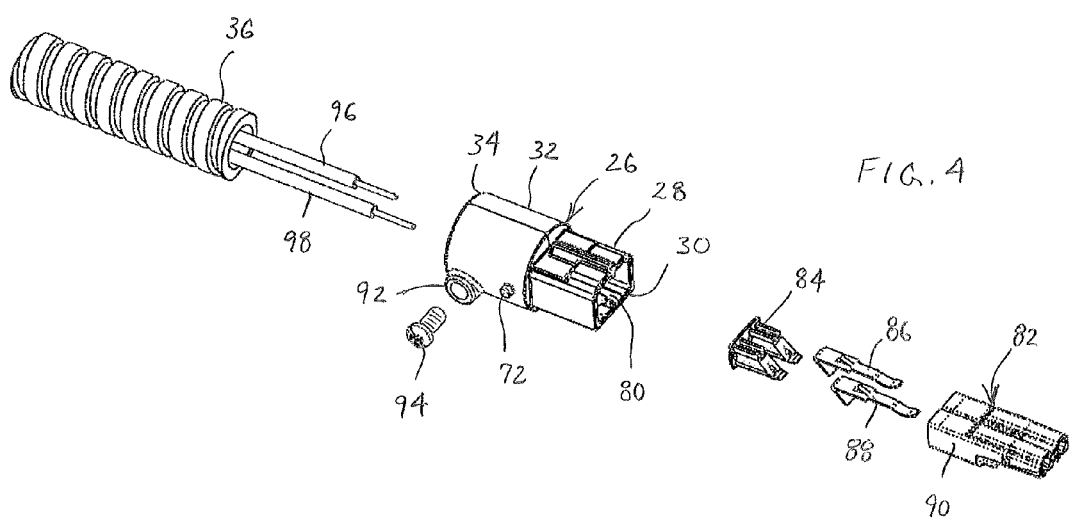
FIG. 4 is a perspective exploded view of a second housing of the conduit connector of FIG. 1, with a second portion of a mating electrical connector assembly.

FIG. 4 shows the first face 30 of the front portion 28 of the second housing 26 of the conduit connector 10 having a respective cavity 80 that is adapted to contain a second portion 82 of the electrical connector assembly 44. The second portion 82 of the electrical connector assembly 44 includes a wire cap 84, terminals 86, 88, and a non-conductive housing 90. The wire cap 84 and non-conductive housing 90 preferably are constructed of plastic, such as by molding, while the terminals 86, 88 are constructed of conductive material to assist in forming electrical connections.

The rear portion 32 of the second housing 26 of the conduit connector 10 includes a third face 92. The third face 92 is adapted to receive a fastener 94, such as a threaded screw, which can be adjusted to retain the second housing 26 on the second flexible conduit 36. While the illustrated example uses a threaded fastener, it will be appreciated that alternative connection configurations could be utilized for the connections between the housings and the respective flexible conduit, as discussed above with the first housing 14. Also, while the current example shows two conductors, wires 96, 98, extending from the second flexible conduit 36, as noted previously, the conduit connector components may be configured to accommodate one or more conductors.

In this illustrated example, the terminals 86, 88 permit quick, push-in wire termination for the conductive portions of the wires 96, 98 extending from the second flexible conduit 36, with the wire cap 84 allowing for zero insertion force wire termination. The wire cap 84 forms a first face of the second portion 82 of the electrical connector assembly 44 and permits insertion of the wires, while an opposite second face 89 of the second portion 82 is adapted for engagement with the first portion 42 of the electrical connector assembly 44.

Figure 5:
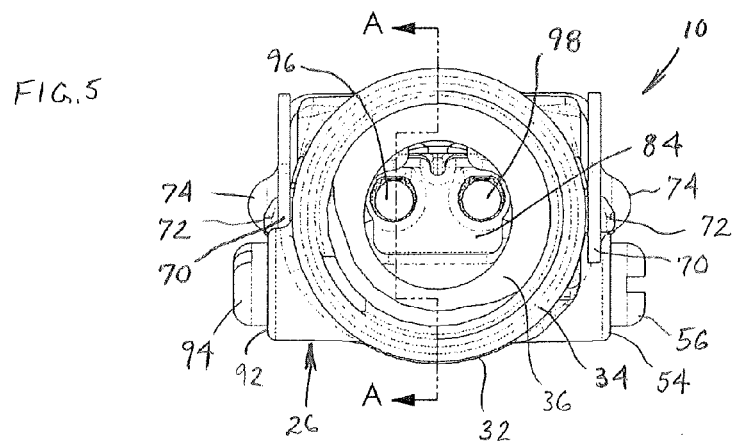
FIG. 5 is an end view of the conduit connector of FIG. 1 in an installed position.
Figure 6:
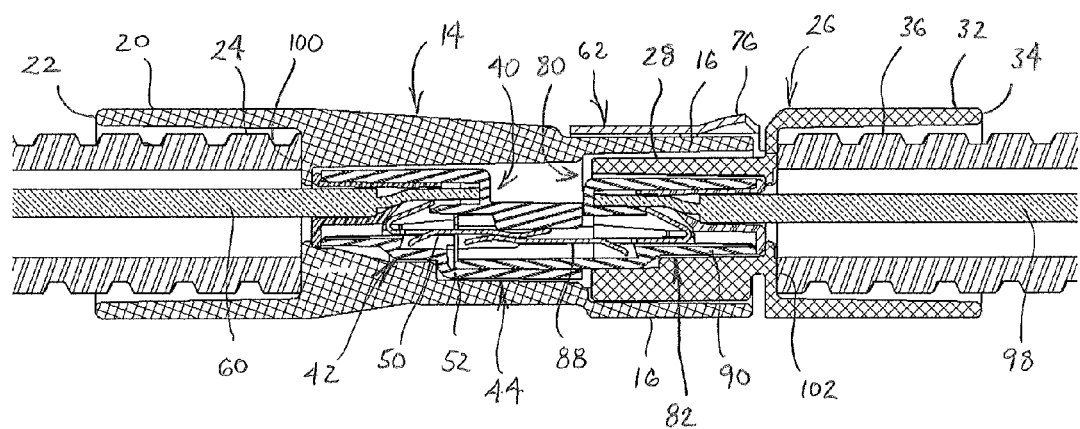
FIG. 6 is a section view A-A of the conduit connector shown in FIG. 5.

FIG. 5 shows an end view of the conduit connector 10 in an installed position from the rear of the second housing 26. FIG. 6 illustrates a section view A-A of the conduit connector 10 in the installed position, showing the housings 14, 26 in mating, overlapping engagement. FIG. 6 also shows the first portion 42 and second portion 82 of the electrical connector assembly 44 contained in the cavities 40, 80, respectively, of the housings 14, 26, and being in mating, overlapping engagement. A separation wall 100 is located between the front portion 16 and the rear portion 20 in the first housing 14 of the conduit connector 10. A similar separation wall 102 is located between the front portion 28 and the rear portion 32 in the second housing 26 of the conduit connector 10. The separation walls 100, 102 provide protection from abrasion from the ends of the flexible conduits 24, 36, respectively, for the wires, 58, 60 and 96, 98, and the first and second portions 42, 82 of the electrical connector assembly 44.

Figure 7:
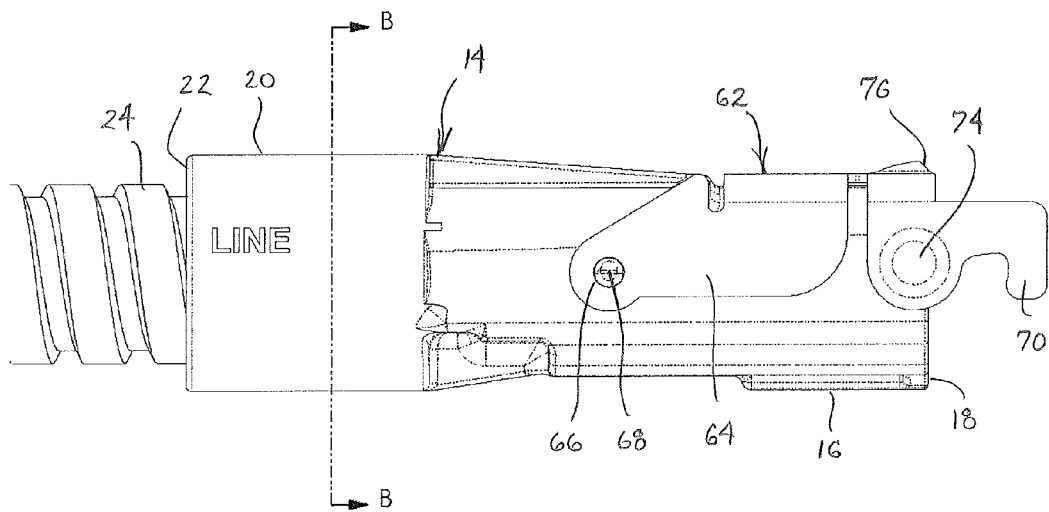
FIG. 7 is a side view of the first housing of the conduit connector of FIG. 1 in an installed position.
Figure 8:
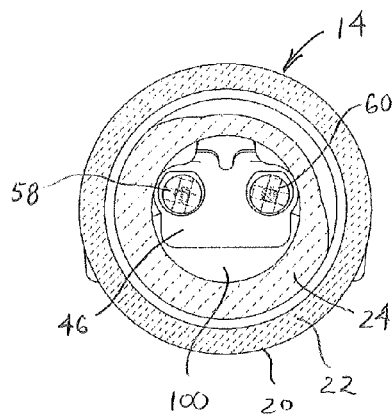
FIG. 8 is a section view B-B of the installed first housing shown in FIG. 7.
Figure 9:
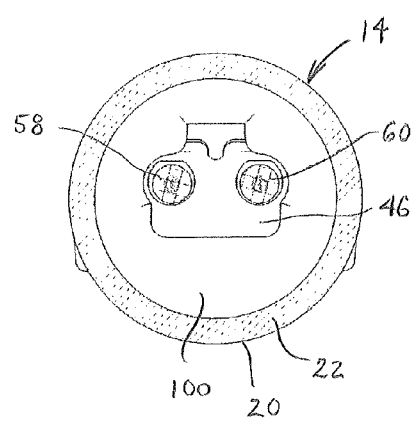
FIG. 9 is a section view B-B of the first housing shown in FIG. 7 with the flexible conduit removed.

FIG. 7 shows a side view of the first housing 14 of the conduit connector 10 installed on the flexible conduit 24. FIG. 8 illustrates a section view B-B from the rear of the first housing 14 when it is in an installed position on the flexible conduit 24, while FIG. 9 illustrates the same section view B-B, but with the flexible conduit 24 removed.

Figure 10:
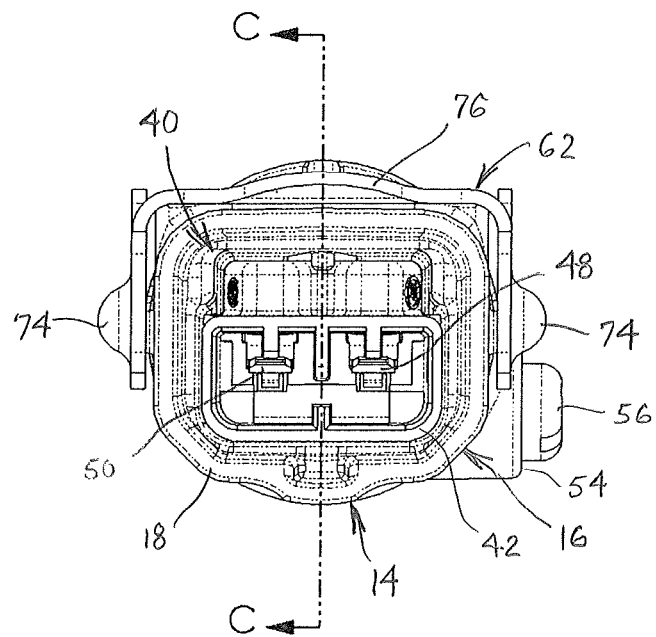
FIG. 10 is a front end view of the first housing with a first portion of a mating electrical connector disposed therein.
Figure 11:
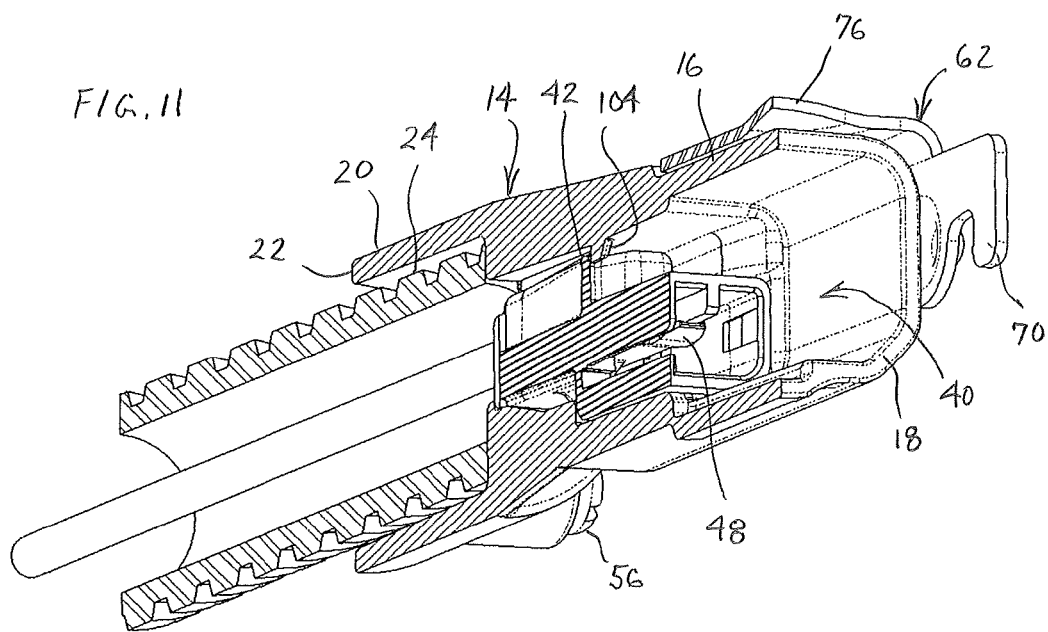
FIG. 11 is a perspective section view C-C of the first housing shown in FIG. 10.

FIG. 10 shows an end view of the first housing 14 with the first portion 42 of the electrical connector assembly 44 contained in the cavity 40 of the conduit connector 10. FIG. 11 illustrates a perspective section view C-C of the assembly shown in FIG. 10. Along the upper wall of the cavity 40 of the first housing 14 is a projection 104 that is utilized when a first portion 42 of an electrical connector assembly 44 is inserted into the cavity 40 of the conduit connector 10 so as to retain the first portion 42 within the housing 14. The projection 104 may be formed into the housing 14 of the conduit connector 10, such as during a casting or molding process. It can be appreciated that the projection 104 may be formed using other manufacturing methods such as machining, or that an alternative retention structure, such as a separate latch may be used to retain the first portion 42 of the electrical connector assembly 44 in the cavity 40 of the first housing 14 of the conduit connector 10. Similarly, it will be appreciated that the second housing 26 includes a like projection (not shown) for retention of the second portion 82 of the electrical connector assembly 44 when it is inserted into the cavity 80 of the second housing 26 of the conduit connector 10.

A second example conduit connector 200 is illustrated in FIGS. 12-17. The conduit connector 200 is illustrated as including all of the components present in the first conduit connector 10, denoted with similar numbering for like components, but further includes fittings that may be disposed between each conduit connector housing and respective flexible conduit, with sealing elements being placed between the engagement surfaces of the fitting and housing and of the fitting and flexible conduit. The additional fittings and sealing elements may be used to create an airtight enclosure, thus providing a more robust connection system that prevents debris, dust, or other contaminants from entering the electrical connector assembly that is retained within the conduit connector 200.

Figure 12:
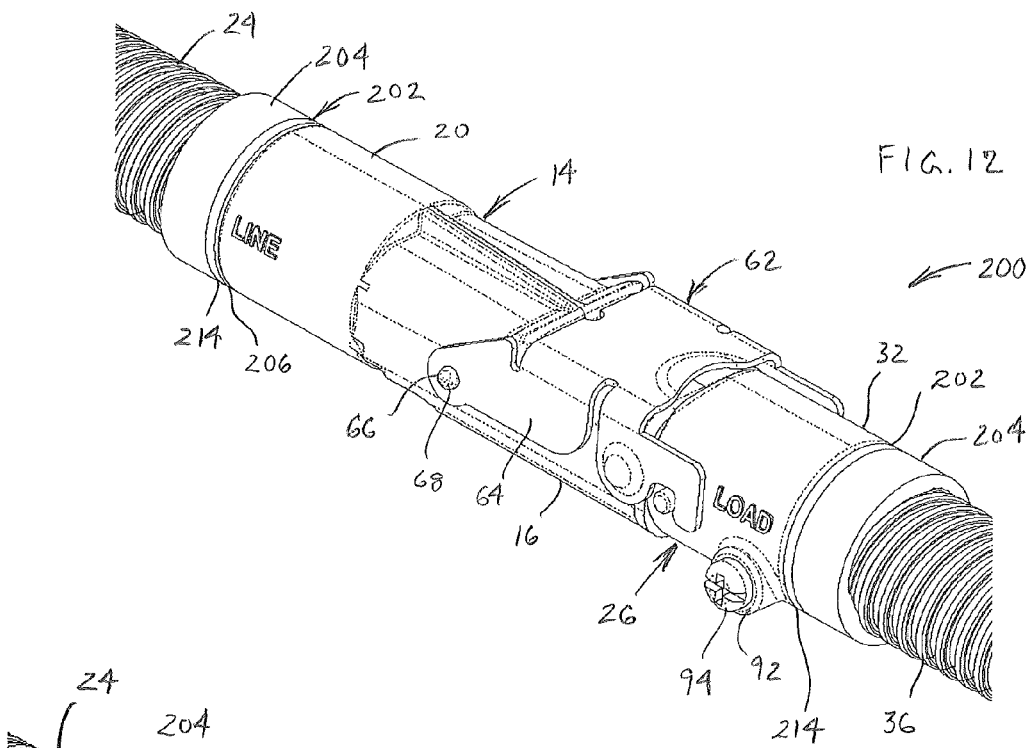
FIG. 12 is a perspective view of a second example conduit connector in an installed position.
Figure 13:
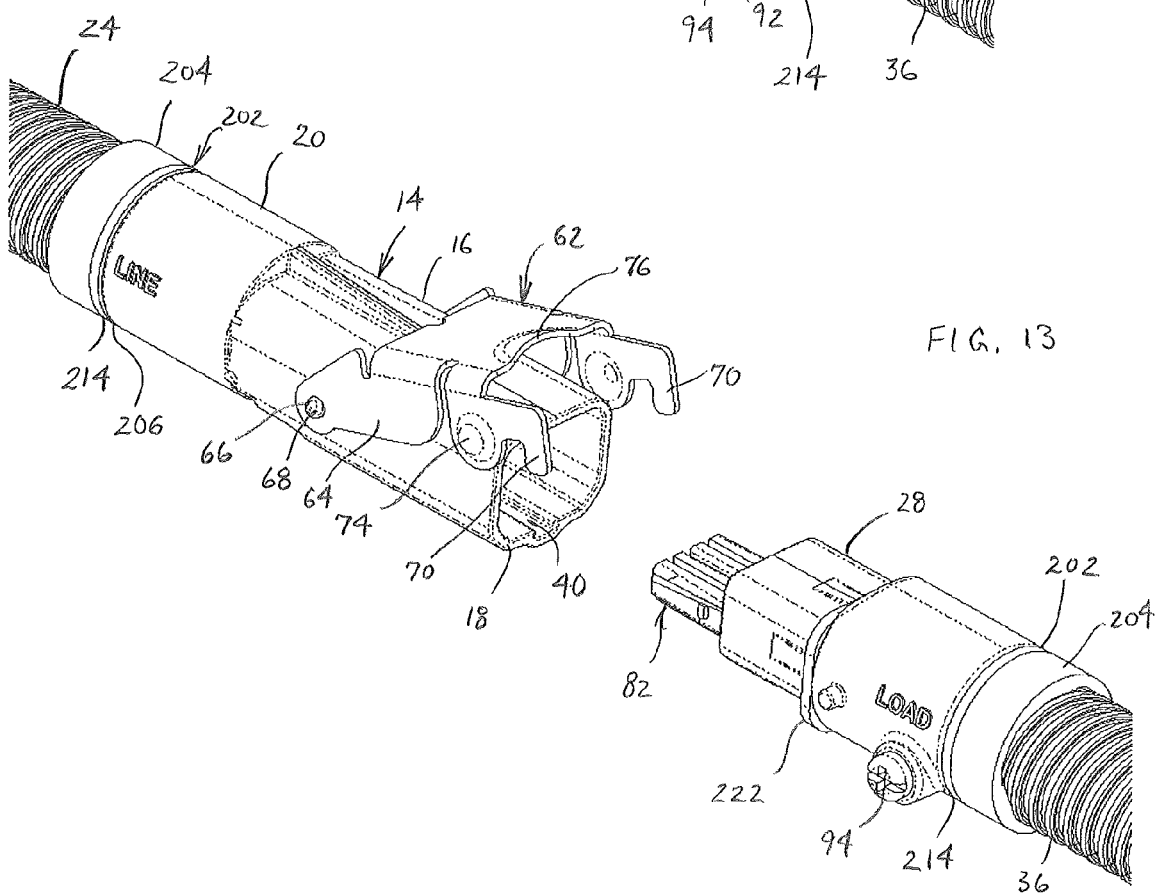
FIG. 13 is a perspective view of the conduit connector of FIG. 12 in a disconnected position.
Figures 14, 15:
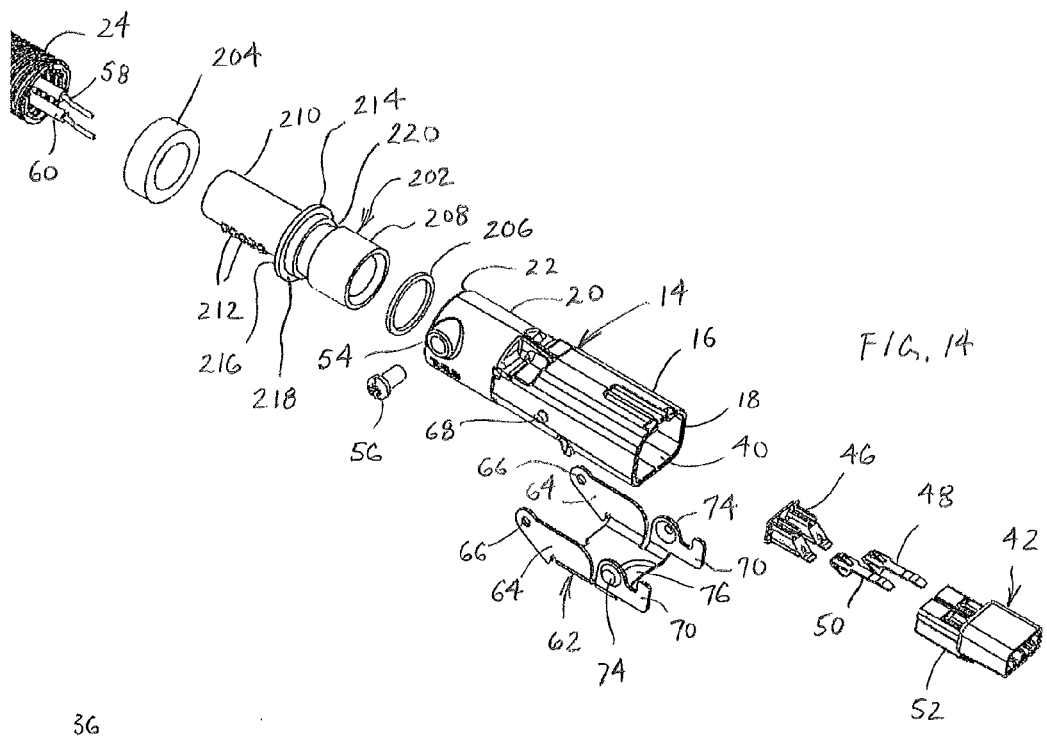
FIG. 14 is a perspective exploded view of a first housing of the conduit connector of FIG. 12, with a first portion of a mating electrical connector assembly.
FIG. 15 is a perspective exploded view of a second housing of the conduit connector of FIG. 12, with a second portion of a mating electrical connector assembly.

Accordingly, in FIGS. 12-14, a fitting 202, first sealing element 204 and second sealing element 206 are disposed between the flexible conduit 24 and the second face 22 of the rear portion 20 of the first housing 14 of the conduit connector 200, respectively. The fitting 202 is configured with a front portion 208 that is slidably received within the rear portion 20 of the first housing 14. The fitting 202 further is configured with a rear portion 210 that includes projections 212 that permit threadable engagement with the inside of the flexible conduit 24. Between the front portion 208 and rear portion 210 is a flange 214 that engages the first sealing element 204 on a rear side 216 and engages the second sealing element 206 on a front side 218. The fitting 202 also has a groove 220 that extends around the fitting 202, as a section of reduced diameter. The fitting 202 is held in place on the flexible conduit 24 by engagement of the fastener 56 with the groove 220. It will be appreciated that other forms of holding engagement could be employed in place of the threadable projections 212 and groove 220. As with the prior examples, it will be appreciated that alternative connections could be utilized between the respective fittings and the housings, as well as between the respective fittings and the flexible conduit.

FIGS. 12, 13 and 15 show use of an identical fitting 202, first sealing element 204 and second sealing element 206 with respect to being disposed between the flexible conduit 36 and the second face 34 of the rear portion 32 of the second housing 26 of the conduit connector 200, respectively. In addition, a third sealing element 222 is disposed on the front portion 28 of the second housing 26 for sealing engagement with the first face 18 of the first housing 14 when the first housing 14 is in mating, overlapping engagement with the second housing 26. It will be appreciated that the first, second and third sealing elements 204, 206, 222 may be constructed of one or more suitable materials to form an effective seal, such as would be found in resilient gasketing materials.

FIG. 16 shows an end view of the conduit connector 200 in an installed position from the rear of the second housing 26. FIG. 17 illustrates a section view A-A of the conduit connector 200 in the installed position, showing the housings 14, 26 in mating, overlapping engagement, while utilizing the additional fittings 202 and seals 204, 206 and 222. FIG. 17 also shows the second sealing elements 206 located between the front portion 208 of the fitting 202 and the separation wall 100, 102, respectively. The illustration of the remainder of the conduit connector 200 is similar to that described above with respect to the first example.

Although the present disclosure describes particular example embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications that fall within the true spirit and scope of the invention.

I claim:

1. A conduit connector adapted to connect to flexible electrical conduit, the conduit connector comprising: a first housing being of unitary construction having a front portion having a cavity adapted to contain a first portion of an electrical connector assembly and a rear portion adapted to receive an end of a flexible conduit, and a second housing having a front portion having a cavity adapted to contain a second portion of said electrical connector assembly; wherein said second housing is configured to engage said first housing while said second portion of said electrical connector assembly engages said first portion of said electrical connector assembly.

2. The conduit connector of claim 1, wherein said first housing and said second housing are made of a metal material.

3. The conduit connector of claim 2, wherein a rear portion of said second housing comprises a rear portion adapted to receive an end of a flexible conduit.

4. The conduit connector of claim 1, further comprising a screw that engages said first housing and is adapted to hold a flexible conduit in a rear portion thereof.

5. The conduit connector of claim 1, wherein the unitary construction of said first housing further includes a separation wall between said front and rear portions of said first housing.

6. The conduit connector of claim 1, wherein said cavity in said front portion of said first housing contains a projection adapted to retain said first portion of said electrical connector assembly within said first housing.

7. The conduit connector of claim 1, wherein said first portion of said electrical connector assembly is adapted to receive via a push-in wire termination at least one conductor of a stripped end of a wire extending from an end of a flexible conduit.

8. The conduit connector of claim 7, wherein said first portion of said electrical connector assembly is adapted to provide a zero insertion force wire termination.

9. The conduit connector of claim 1, wherein a sealing element is disposed between said first housing and said second housing.

10. The conduit connector of claim 9, wherein the sealing element is disposed between a first face on said front portion of said first housing and a first face on said front portion of said second housing.

11. The conduit connector of claim 1, wherein a rear portion of said second housing further comprises a rear portion adapted to receive an end of a flexible conduit.

12. The conduit connector of claim 11, wherein a first sealing element is disposed between said rear portion of said first housing and an end of a first flexible conduit, and a second sealing element is disposed between said rear portion of said second housing and an end of a second flexible conduit.

13. The conduit connector of claim 12, wherein a third sealing element is disposed between said first housing and said second housing.

14. The conduit connector of claim 13, wherein a third sealing element is located on said front portion of said second housing.

15. The conduit connector of claim 1, wherein said first housing is configured to receive said second housing in overlapping engagement.

16. The conduit connector of claim 1, wherein a retention clip is adapted for releasable connection of said first housing to said second housing.

17. The conduit connector of claim 16, wherein the retention clip is connected to said first housing and is adapted for releasable connection to said second housing.

18. The conduit connector of claim 9, wherein said first and second housing portions each include a front face and said sealing element is disposed between said respective front faces of said first and second housings.

19. The conduit connector of claim 6, wherein said projection is part of the unitary construction of the first housing.

* * * * *